United States Patent
Raciborski

(10) Patent No.: US 6,767,605 B1
(45) Date of Patent: Jul. 27, 2004

(54) MOUSEPAD HAVING WRIST SUPPORT

(76) Inventor: Daniel J. Raciborski, 612 Highland Ave., Woodstock, IL (US) 60098

( * ) Notice: Subject to any disclaimer, the term of this patent is extended or adjusted under 35 U.S.C. 154(b) by 0 days.

(21) Appl. No.: 10/309,458

(22) Filed: Dec. 4, 2002

(51) Int. Cl.$^7$ .................................................. B32B 3/06
(52) U.S. Cl. .......................... 428/100; 428/99; 428/192
(58) Field of Search .............................. 428/71, 76, 99, 428/100, 192; 248/118.1, 346.01, 118, 918

(56) References Cited

U.S. PATENT DOCUMENTS

| | | | |
|---|---|---|---|
| 3,637,454 A | * 1/1972 | Pavernick | 248/118 |
| 5,228,655 A | * 7/1993 | Garcia et al. | 248/118 |
| 5,355,811 A | 10/1994 | Brewer | |
| 5,374,018 A | * 12/1994 | Daneshvar | 248/118 |
| 5,593,128 A | 1/1997 | Odom | |
| 6,187,398 B1 | 2/2001 | Eldridge | |
| 6,368,693 B1 | 4/2002 | Livingstone | |

* cited by examiner

*Primary Examiner*—Alexander S. Thomas
(74) *Attorney, Agent, or Firm*—Barnes & Thornburg LLP

(57) ABSTRACT

A mousepad having support for the user's wrist. A pad platform is surrounded with a peripheral wrist support comprising a tubular element filled with a mobile fill media, such as a plurality of pellets. The tubular elements extends above the pad platform sufficiently so that the user's wrist is supported, thereby substantially lessening fatigue over long periods of use.

10 Claims, 2 Drawing Sheets

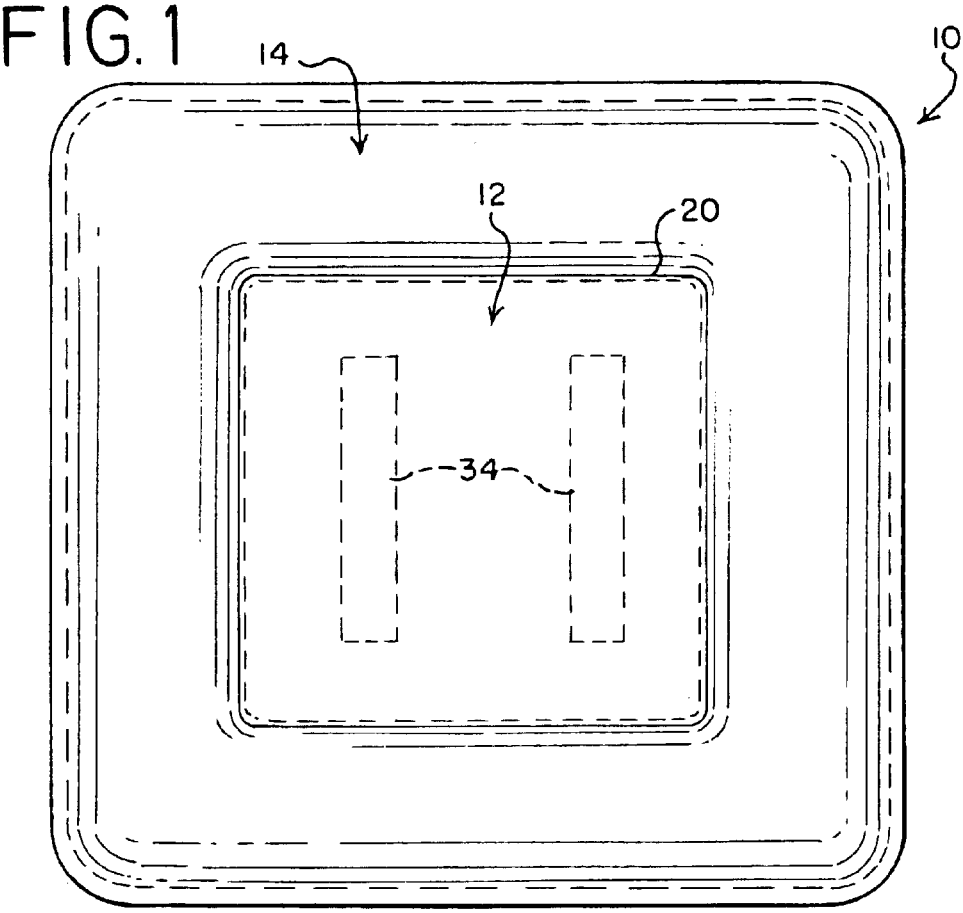
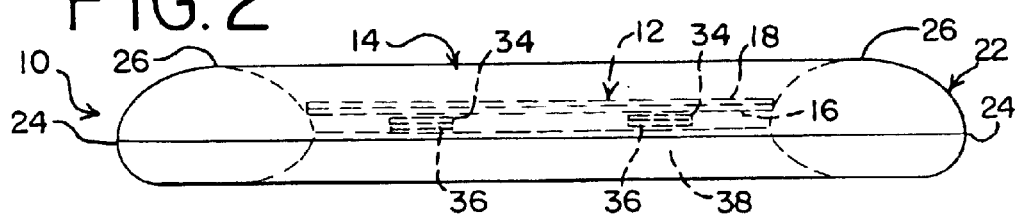
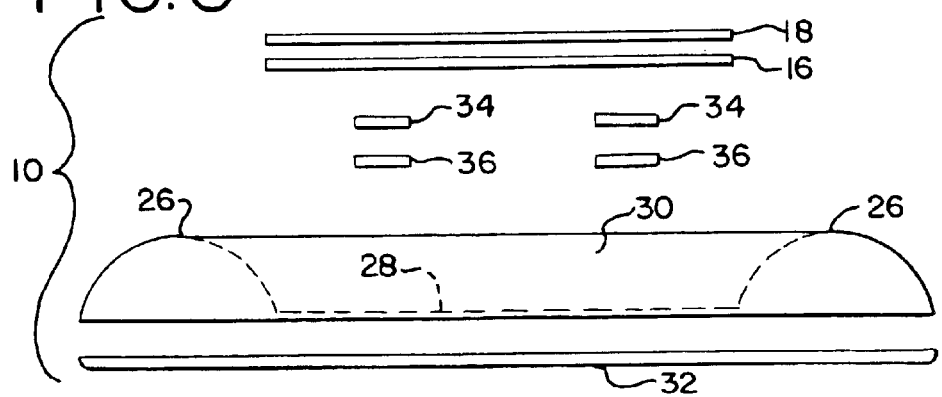

MOUSEPAD HAVING WRIST SUPPORT

BACKGROUND OF THE INVENTION

This invention relates to mousepads and tracking aids for computers and the like, and in particular to a mousepad having a comfortable support for the mouse user.

A computer mouse is a typical device used to aid the processing of information in a computer. Computer users typically use a mouse in combination with the computer keyboard, and even more commonly, sometimes a mouse is used without even requiring use of the keyboard.

The computer mouse normally is operated on a flat surface, with that surface often being known as a mousepad. That surface typically has sufficient friction so that the tracking ball of the computer mouse rotates appropriately as the computer mouse is navigated across the operating surface, moving the cursor on the user's computer screen.

Mousepads may be provided in practically any size or shape, and typically are quite thin, in order to reside on a flat surface proximate the computer keyboard. Many devices have been developed, however, for locating the mousepad elsewhere. For example, U.S. Pat. No. 6,187,398 discloses a computer mousepad mounted on a flexible membrane which is filled with a fluid-like media so that the device can be used on an uneven surface and conform to the contour of that surface. That surface could be anything from the leg of a user to a cluttered desktop.

U.S. Pat. Nos. 6,368,693; 5,593,128 and 5,355,811 disclose computer mousepads adapted to being situated on a user's thigh. The mousepad of the '693 patent is flexible to conform to the contour of the leg, while the '128 and '811 patents have rigid surfaces having retaining walls or lips forming a boundary beyond which a computer mouse cannot travel.

None of the prior art devices address wrist and arm fatigue that can occur when a user is employing a mousepad for long periods of time.

SUMMARY OF THE INVENTION

The inventions directed to a computer mousepad and tracking aid which includes a pad platform having an operating surface and extending to a first surrounding outer margin. A peripheral wrist support is provided, having at least a portion extending above and beyond the first surrounding outer margin of the pad platform. The, wrist support includes a tubular element extending laterally to a second surrounding outer margin and the tubular element includes an upper boundary spaced above the operating surface. Means is provided for securing the pad platform proximate the wrist support.

In accordance with the preferred form of the invention, the tubular element comprises a flexible membrane having a hollow inner cavity. A mobile fill media is contained within the membrane. In one form, the mobile fill media comprises a plurality of pellets. In another form, the mobile fill media comprises a flowable material.

The pad platform is preferably substantially rigid. The securing means comprises an appropriate means of fixing the pad platform in place, such as hook-and-loop fasteners, adhesive strips, or other appropriate means.

In one form of the invention, a cavity is located beneath the pad platform, having mobile fill media therewithin. The cavity can form part of, or be separate from, the tubular element comprising the peripheral support.

In one form of the invention, the operating surface comprises an upper surface of the pad platform. In another form of the invention, the operating surface comprises a covering applied, and appropriately affixed to, the pad platform.

BRIEF DESCRIPTION OF THE DRAWINGS

The invention is described in greater detail in the following description of examples embodying the best mode of the invention, taken in conjunction with the drawing figures, in which:

FIG. 1 is a top plan view of one form of a computer mousepad and tracking aid according to the invention, FIG. 2 is a side elevational illustration of the form of the invention shown in FIG. 1, FIG. 3 is an exploded assembly view of the first form of the invention.

DESCRIPTION OF EXAMPLES EMBODYING THE BEST MODE OF THE INVENTION

Figure 4:
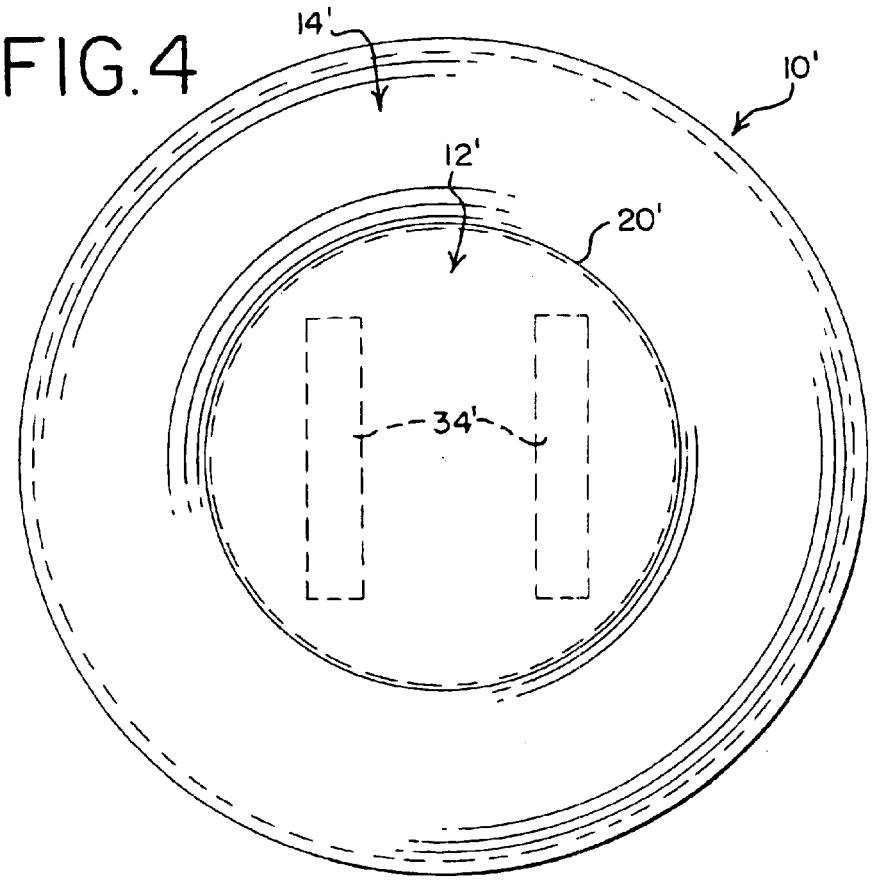
FIG. 4 is a top plan view of a second embodiment of the invention.

A first form of a computer mousepad and tracking aid according to the invention is shown generally at 10 in FIGS. 1 through 3. The computer mousepad and tracking aid 10 comprises two basic elements, a pad platform 12 and peripheral wrist support 14.

The pad platform 12 comprises two elements, an underlying hard platform 16 and an overlying operating surface or pad 18. The pad 18 may have various indicia applied to it, and that forms no part of the invention. Also, although the pad 18 is shown as a separate element that is applied to the hard platform 16, the pad 18 could actually be directly formed on, or as a part of, the hard platform 16, so long as the pad 18 serves the normal purpose of providing a frictional operating surface upon which a computer mouse can be traversed. As its name suggests, the hard platform 16 is substantially rigid so that the entire pad platform 12 is substantially rigid, as well.

The pad platform 12 extends to a first surrounding outer margin 20. The surrounding outer margin 20 is simply the outer periphery of the pad platform and, as illustrated in the drawing figures, the hard platform 16 and the pad 18 have the same extent. While the pad platform 12 is shown as a generally square structure, other shapes can be employed, as well, as seen in relation to the second embodiment in FIGS. 4 through 6 and the following further description of the invention.

The peripheral wrist support 14 extends above and beyond the first surrounding outer margin 20 and comprises a tubular element 22 surrounding the pad platform 12. The tubular element 22 extends laterally to a second surrounding outer margin 24, and the tubular element 22 has an upper boundary 26 spaced above the pad 18, which is sufficiently above the pad platform 12 so that a user's wrist may comfortably rest on the tubular element 22 when a mouse is used. A central web 28 underlies the pad platform 12 and forms a surface upon which the pad platform 12 is mounted, as described below.

The tubular element 22 can be formed in any manner, and as shown in FIG. 3, it can be formed from an upper tubular element 30 and a lower tubular element 32 which are joined appropriately at a seam along the second surrounding outer margin 24, as well as an inner seam at the outer extent of the central web 28. Any means of forming the structure shown in the drawing figures can be utilized, so long as the tubular element 22 is hollow, and the central web 28 extends beneath the pad platform 12 so that the pad platform 12 may be appropriately mounted in place.

The tubular element 22 comprises a flexible membrane which has a hollow inner cavity. A mobile fill media is contained within the membrane, such as a plurality of pellets, a flowable material, foam, or any other material that gives the tubular element 22, when filled, some flexibility for wrist comfort when a user is employing the mousepad 10.

The pad platform 12 is appropriately affixed to the central web 28 to make the mousepad 10 a unitary structure. One means of doing so is by hook-and-loop fasteners, commonly known by the trademark Velcro fasteners. Such a fastener comprises one hook element, and one loop element, which when joined adhere to one another. As shown in FIG. 3, a hook element 34 and a loop element 36 (or vice versa) are utilized, with the element 34 affixed to the underside of the hard platform 16 and the element 36 affixed to the central web 28, such as by adhesives, sonic welding, or any other means of affixing one element to another.

Alternatively, rather than securing the pad platform 12 to the central web 28 with a hook-and-loop fastener, other means of fastening, such as adhesives, tape, or any other means of affixing one element to another can be employed. For example, the elements 34 and 36 can be replaced by adhesive strips, liquid adhesives, or direct welding of the pad platform 12 to the central web 28 can be employed.

A cavity 38 is formed beneath the central web 28. While the cavity 38 can be hollow, it also can be filled with the mobile fill media filling the tubular element 22. Also, depending on how the mousepad 10 is formed, the cavity 38 can be in direct communication with the tubular element 22 rather than separated therefrom.

Figure 5:
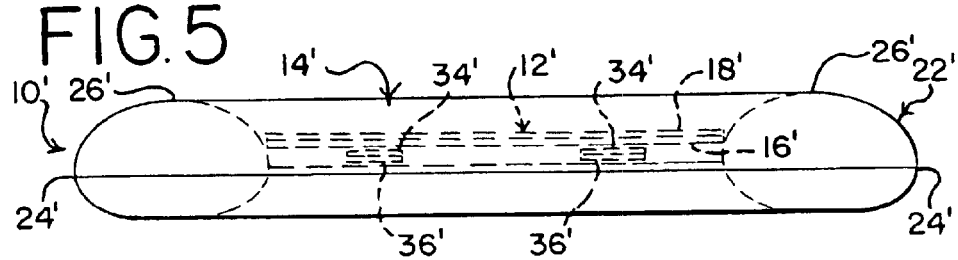
FIG. 5 is an elevational view of the second embodiment of the invention.
Figure 6:
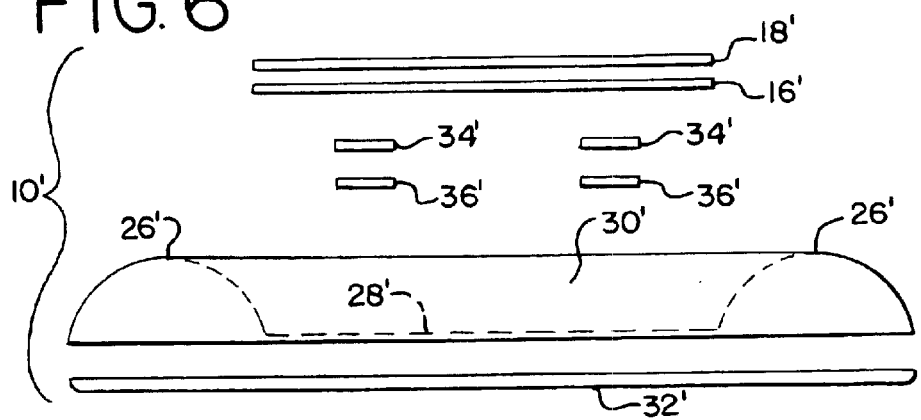
FIG. 6 is an exploded assembly view of the second embodiment of the invention.

A second form of the invention is shown in FIGS. 4 through 6. The only difference between the first form of the invention of FIGS. 1 through 3 and that of FIGS. 4 through 6 is the shape. While the shape shown in FIGS. 4 through 6 is generally circular, other shapes can be employed, as well, and those illustrated in the drawing figures are simply preferred forms, not the only forms. For the sake of consistency and clarity, since the elements in FIGS. 4 through 6 correspond to those in FIGS. 1 through 3, the elements in FIGS. 4 through 6 bear the same reference numerals, simply being identified by being primed.

The invention provides a comfortable, versatile mousepad and tracking aid which can be used for long periods of time without wrist fatigue. Various changes can be made to the invention without departing from the spirit thereof or scope of the following claims.

What is claimed is:

1. A computer mousepad and tracking aid, comprising;
   a. a smooth pad platform having an exposed operating surface and a first surrounding outer margin,
   b. a peripheral wrist support having at least a portion extending above and beyond said first surrounding outer margin, said wrist support including a tubular element extending laterally to a second surrounding outer margin, said tubular element having an upper boundary spaced between said surrounding outer margins and above said operating surface, and
   c. means securing said pad platform proximate said wrist support.

2. The mouse pad and tracking aid according to claim 1, in which said tubular element comprises a flexible membrane having a hollow cavity, and a mobile fill media contained within the said membrane.

3. The mouse pad and tracking aid according to claim 2, in which said mobile fill media comprises a plurality of pellets.

4. The mouse pad and tracking aid according to claim 2, in which said mobile fill media comprises flowable material.

5. The mouse pad and tracking aid according to claim 1, in which said pad platform is substantially rigid.

6. The mouse pad and tracking aid according to claim 1, in which said securing means comprises at least one hook-and-loop fastener.

7. The mouse pad and tracking aid according to claim 1, in which said securing means comprises at least one adhesive strip.

8. The mouse pad and tracking aid according to claim 1, including a cavity beneath said pad platform, said cavity having a mobile fill media therwithin.

9. The mouse pad and tracking aid according to claim 1, in which said operating surface comprises an upper surface of said pad platform.

10. The mouse pad and tracking aid according to claim 1, in which said operating surface comprises a covering applied to a said pad platform.

\* \* \* \* \*